(12) United States Patent
Lauwereys et al.

(10) Patent No.: US 8,628,045 B2
(45) Date of Patent: Jan. 14, 2014

(54) HIGH-LIFT DEVICE TRACK HAVING A U-SHAPED TO H-SHAPED CROSS-SECTION

(75) Inventors: Guy Lauwereys, Overijse (BE); Frédéric Paulis, Nodebais (BE); Miguel Ramirez Garcia, Milmort (BE); Juan-Carlos Ramirez Ramirez, Grace-Hollogne (BE); Stijn Vandegaer, Stok-Kortenaken (BE); Yvon Vandenbulcke, Braine-le-Comte (BE)

(73) Assignee: Asco Industries, Zaventem (BE)

( * ) Notice: Subject to any disclaimer, the term of this patent is extended or adjusted under 35 U.S.C. 154(b) by 532 days.

(21) Appl. No.: 12/914,545

(22) Filed: Oct. 28, 2010

(65) Prior Publication Data
US 2011/0101175 A1    May 5, 2011

(30) Foreign Application Priority Data
Oct. 29, 2009    (EP) .................... 09174472

(51) Int. Cl.
*B64C 3/58* (2006.01)
*B64C 9/00* (2006.01)

(52) U.S. Cl.
USPC ........................... 244/213; 244/99.3

(58) Field of Classification Search
USPC ............... 244/210–215, 87, 218–219
See application file for complete search history.

(56) References Cited

U.S. PATENT DOCUMENTS

| | | | |
|---|---|---|---|
| 1,917,428 A * | 7/1933 | Burnelli | 244/214 |
| 2,222,935 A * | 11/1940 | Chilton | 244/214 |
| 2,383,102 A * | 8/1945 | Zap | 244/90 R |
| 4,361,299 A | 11/1982 | Sharrock | |
| 4,469,297 A * | 9/1984 | Cole | 244/215 |
| 4,471,928 A * | 9/1984 | Cole | 244/215 |
| 4,475,702 A * | 10/1984 | Cole | 244/214 |
| 4,650,140 A * | 3/1987 | Cole | 244/214 |
| 4,687,162 A * | 8/1987 | Johnson et al. | 244/213 |
| 4,753,402 A * | 6/1988 | Cole | 244/210 |
| 5,544,847 A * | 8/1996 | Bliesner | 244/214 |
| 5,839,699 A * | 11/1998 | Bliesner | 244/214 |
| 8,025,257 B2 * | 9/2011 | Gyuricsko et al. | 244/214 |

(Continued)

FOREIGN PATENT DOCUMENTS

EP    0291328    11/1988

OTHER PUBLICATIONS

European Search Report dated Mar. 18, 2010, Application No. EP-09-17-4472 (3 pages).

*Primary Examiner* — Tien Dinh
*Assistant Examiner* — Michael A Fabula
(74) *Attorney, Agent, or Firm* — McCracken & Frank LLC

(57) ABSTRACT

A high-lift device track 5 comprising a first track end 6 comprising attachment points for the high-lift device 4, two vertical flanges 16 connected by a horizontal web 17, a set of raceways 10,11,12 for guiding rollers 13 or glide pads, and a gear rack 7 installed between said flanges 16 over a first track segment 18. This first track segment 18 presents an inverted-U, or ⊓ cross-section. However, between said first track segment 18 and a second track end 20 opposite to said first track end 6, the track 5 comprises a second track segment 21 presenting a depth d between the horizontal web 17 and lower edges 25 of the vertical flanges 16 which decreases towards said second track end 20, so that, at said second track end, the track presents an H cross-section. FIG. 4.

13 Claims, 5 Drawing Sheets

(56) References Cited

U.S. PATENT DOCUMENTS

| | | | |
|---|---|---|---|
| 8,181,913 B2* | 5/2012 | Jaggard et al. | 244/214 |
| 8,387,924 B2* | 3/2013 | Gyuricsko et al. | 244/214 |
| 2007/0102587 A1* | 5/2007 | Jones et al. | 244/214 |
| 2009/0127402 A1* | 5/2009 | Jaggard et al. | 244/213 |
| 2009/0146014 A1* | 6/2009 | Gyuricsko et al. | 244/213 |
| 2010/0187367 A1* | 7/2010 | Dahl | 244/213 |

\* cited by examiner

HIGH-LIFT DEVICE TRACK HAVING A U-SHAPED TO H-SHAPED CROSS-SECTION

TECHNICAL FIELD

The present invention relates to tracks for the support and deployment of high-lift devices in airfoils, and in particular to slat tracks.

To temporarily increase the lift generated by airfoils, in particular aircraft wings, it is well-known in the art to deploy movable high-lift devices, such as leading edge slats or trailing edge flaps, from a retracted position to an extended position in which they increase the area and/or camber of the airfoil. In the case of leading edge slats, their deployment may also create at least one opening between the slat and the main body of the airfoil.

BACKGROUND OF THE INVENTION

To support such high-lift devices and guide them during their deployment, it is also well-known in the art to use tracks fixed to the high-lift device and comprising raceways for contacting rollers or glide pads mounted on the main body of the airfoil.

Besides support and guidance of the movable high-lift devices, transferring aerodynamic loads on the high-lift device to the main body of the airfoil, some tracks may also perform the additional function of transmitting the extension and/or retraction forces from an actuator to the high-lift device. Such driven high-lift device tracks can be actuated by linear or rotational actuators. In the case of a rotational actuator, the track may be driven through a lever and drive link mechanism, or through a rack and pinion mechanism.

One such high-lift device track, driven by a rotational actuator through a rack and pinion mechanism, has been disclosed in US Patent Application Publication US 2007/0102587 A1, which appears to represent the closest prior art. This high-lift device track comprises a first track end comprising attachment points for the high-lift device, two vertical flanges connected by a horizontal web, raceways for guiding rollers or glide pads, and a gear rack installed between said flanges over a first track segment. To accommodate said gear rack between the two vertical flanges, this first track segment presents an inverted-U, or ⊓ cross-section.

In order to ensure accurate and smooth operation, i.e. retraction and extension, as well as durability and maintainability of the entire mechanism, tolerances are very tightly controlled at all interfaces between the high-lift device track and the surrounding structure of the main body of the airfoil. Key dimensions are the height and width of the cross section of the high-lift device track, as this envelope has to be guided by the guide rollers and/or glide pads. The width tolerance has to be achieved at the top and bottom of the high-lift device track. For the bottom this means the width tolerance has to be achieved at assembly level, after installation of the gear rack.

However, in the conventional production process the channel between the two vertical flanges is usually machined from a full block or forging. This machining step releases internal stresses, in particular at a second end of the beam, opposite to said first end, which may deflect the flanges beyond the abovementioned width tolerance in a transversal plane. This can lead to complex and time consuming, thus costly, assembly principles and quality assurance procedures, as well as limitations at different manufacturing operations of the slat track component.

SUMMARY OF THE INVENTION

It is an object of the present invention to simplify the manufacturing and assembly of the high-lift device track by reducing the deformations caused by the release of internal stresses during the machining of the high-lift device track. It is a further object of the present invention to do this in an at least weight-neutral manner.

To this object, in a high-lift device track comprising a first track end comprising attachment points for the high-lift device, two vertical flanges connected by a horizontal web, a set of raceways for guiding rollers or glide pads, and a gear rack installed between said flanges over a first track segment, wherein said first track segment presents an inverted-U, or ⊓ cross-section, the track comprises a second track segment, between said first track segment and a second track end opposite to said first track end, presenting a decreasing depth between the horizontal web and lower edges of the vertical flanges, so that, at said second track end, the track presents an H cross-section.

By transitioning from the inverted-U, or ⊓ cross-section to an H cross section with the horizontal web joining the vertical flanges at or near their middle, rather than at their upper edges, the internal-stress-induced deflection of the flanges in the transversal plane is minimised, in particular at and near said second end. It becomes thus significantly easier to achieve the required width tolerances for the flat track.

Advantageously, the high-lift device track may be curved, so as to drive and guide the extension and retraction of the high-lift device following a curved trajectory.

Advantageously, the high-lift device track may be a leading-edge high-lift device track, and in particular a slat track.

Advantageously, said raceways may comprise an upper raceway over said horizontal web, and a lower raceway over a lower edge of each vertical flange. These upper and lower raceways can thus guide the track in the vertical plane during extension and/or retraction of the high-lift device.

Advantageously, said raceways may comprise at least two side raceways opposite to each other, thus guiding or restraining the movement of the track out of the vertical plane during extension and/or retraction of the high-lift device.

The present disclosure also relates to a high-lift device assembly comprising at least one high-lift device track as disclosed hereabove and a moveable high-lift device attached to said at least one high-lift device track.

Advantageously, this high-lift device assembly may further comprise a set of rollers and/or gliding pads for engaging said raceways.

Advantageously, this high-lift device assembly may further comprise a rotational actuator with at least one output pinion for engagement with said gear rack.

The present disclosure also relates to method for manufacturing a high-lift device track comprising a first track end comprising attachment points for the high-lift device, two vertical flanges connected by a horizontal web, and a second track end opposite to said first track end.

The method comprises the steps of cutting a first channel from a bottom of a full block so as to form one of said vertical flanges at each side of the channel and said horizontal web at the top of the channel, wherein the two vertical flanges and horizontal web form an inverted-U, or ⊓ cross-section over at least a first track segment, and over a second track segment between said first track segment and said second track end, said first channel is cut with a decreasing depth towards said second track end; and cutting a second channel over at least said second segment, opposite to said first channel, and presenting an increasing depth towards said second track end, so that, at said second track end, the track presents an H cross-section.

Advantageously, the method may further comprise the step of forging said full block prior to cutting said first channel.

Advantageously, the method may further comprise the step of installing a gear rack in said first channel.

Advantageously, said gear rack may be bolted to said vertical flanges and/or horizontal web.

BRIEF DESCRIPTION OF THE DRAWINGS

These and other objects of the present invention will become more readily apparent upon reading the following detailed description and upon reference to the attached drawings in which.

Figure 1:
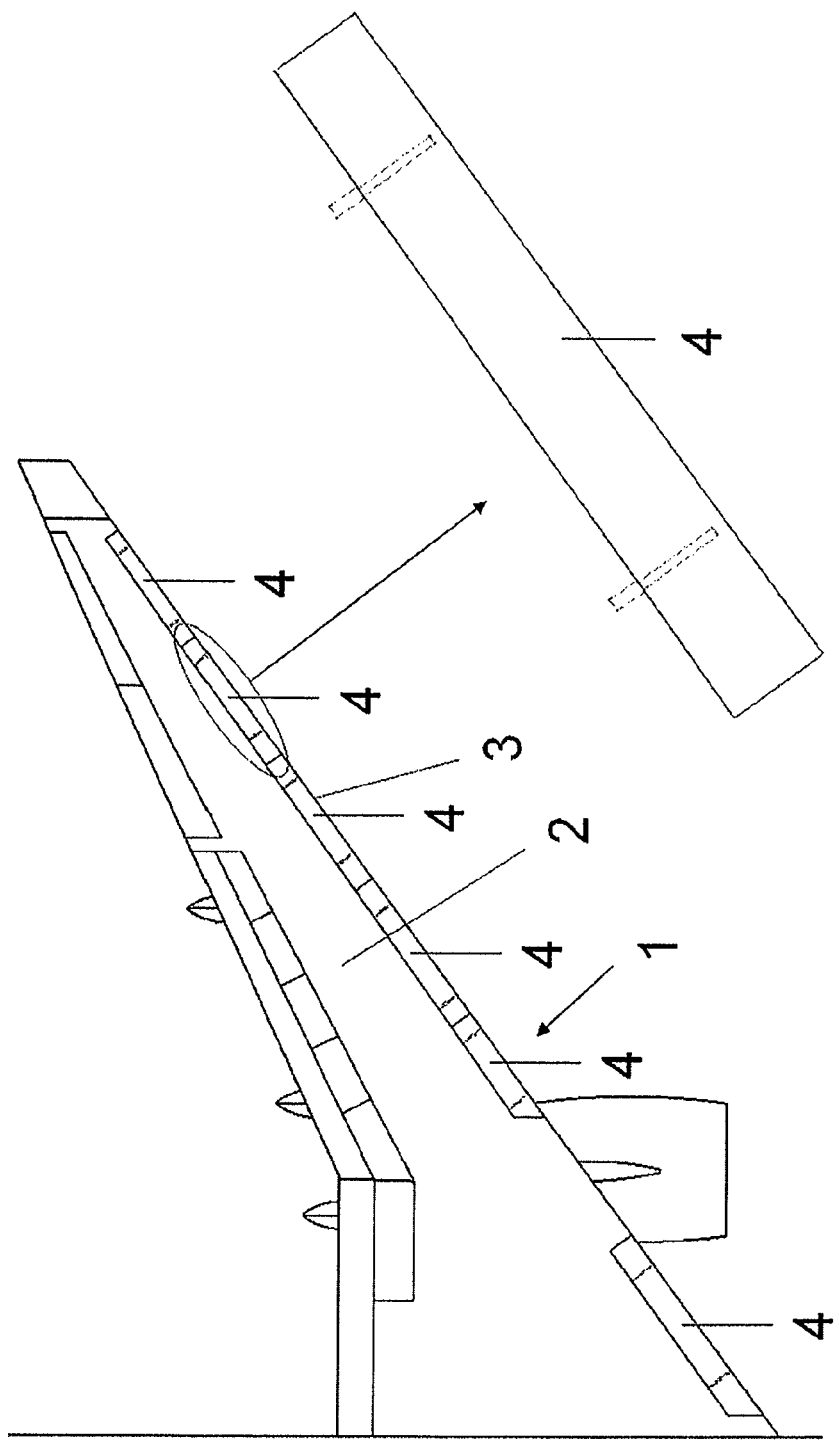
FIG. 1 shows a schematic view of an airfoil in the form of an aircraft wing with a plurality of moveable leading-edge high-lift devices in the form of slats.

While the present invention is susceptible of various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents and alternatives falling within the scope of the invention as expressed in the appended claims.

DETAILED DESCRIPTION OF THE INVENTION

An airfoil, in the form of an aircraft wing 1, is shown on FIG. 1. This aircraft wing 1 comprises a main body 2 as well as, at its leading edge 3, a set of moveable high-lift devices in the form of slats 4. These slats 4 are moveable between a retracted position in which they sit flush with the main body 2 as shown, and an extended position (not illustrated), in which they are spaced forward with respect to the main body 2. Each of these slats 4 is supported, guided and driven through their movement by a plurality of tracks 5.

Figure 2:
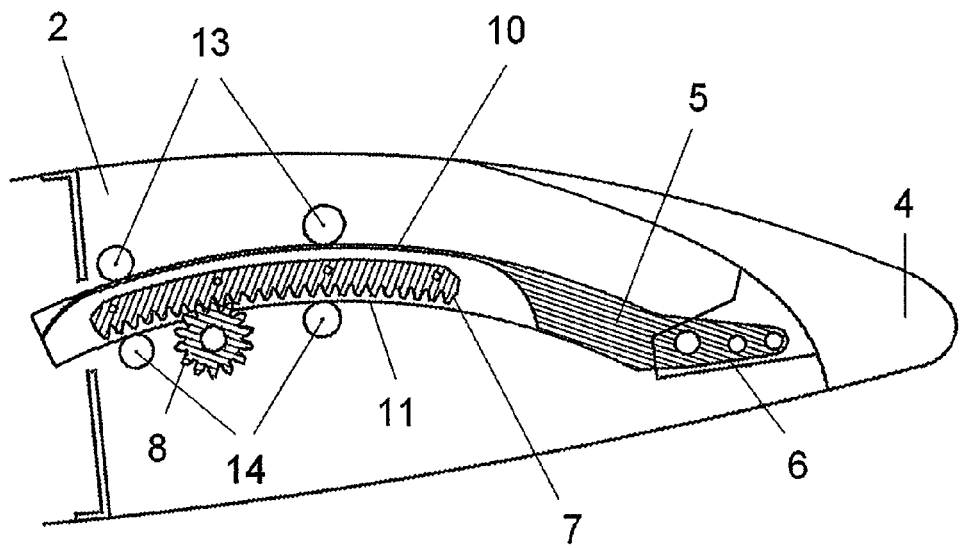
FIG. 2 shows a schematic cut view of a high-lift device assembly comprising a driven high-lift device track attached to a moveable high-lift device.

FIG. 2 shows the high-lift device assembly comprising one such slat 4 as well as one of the tracks 5 attached to it. In the illustrated embodiment, this track 5 is curved so as to guide the slat 4 along a curved trajectory during its extension and retraction. Each track 5 comprises a first track end 6 with attachment points for the slat 4, a gear rack 7 in engagement with an output pinion 8 of a rotational actuator (not illustrated), an upper raceway 10, lower raceways 11. The upper raceway 10 and lower raceways 11 contact, respectively, upper and lower rollers 13, 14 mounted on the main body 2 of the aircraft wing 1, in this particular embodiment on nose ribs of the aircraft wing 1 located at each side of each track 5, so as to guide the track 5 in its movement in the vertical plane.

Figure 3:
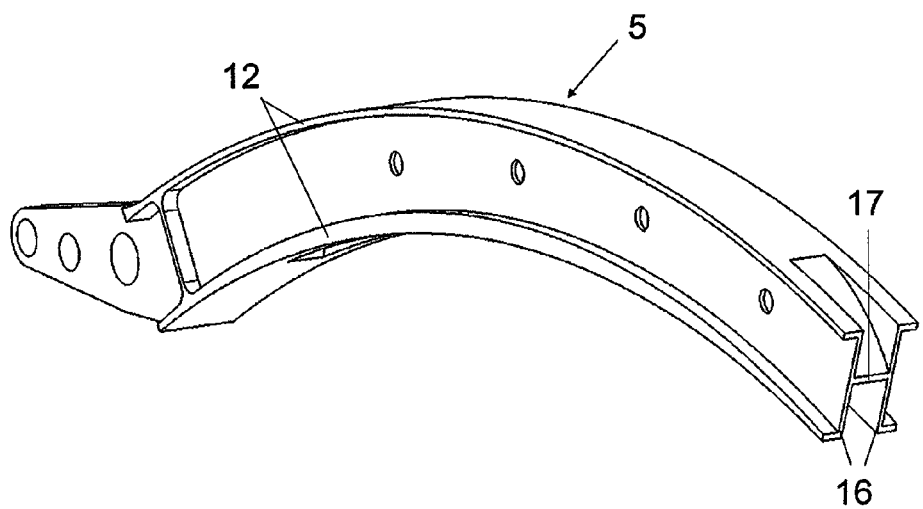
FIG. 3 shows a perspective view of a high-lift device track according to a preferred embodiment of the invention.
Figure 4:
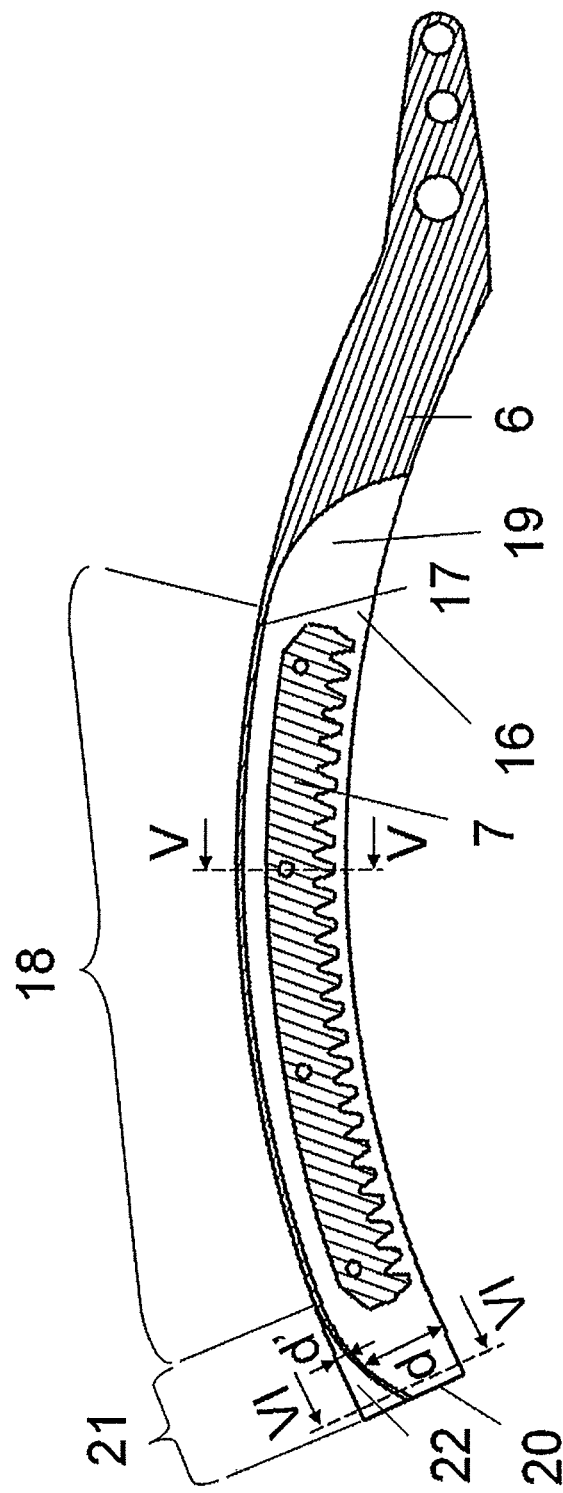
FIG. 4 shows a longitudinal section of the high-lift device track of FIG. 3.
Figure 9:
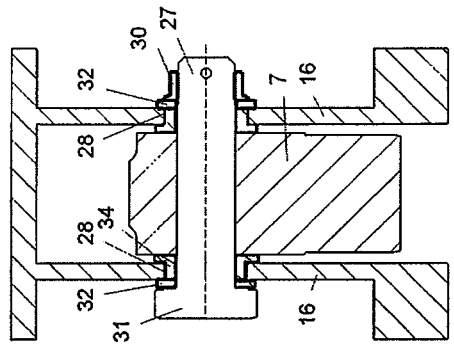
FIG. 9 shows a cross-section of a high-lift device track according to an alternative embodiment of the invention.
Figure 5:
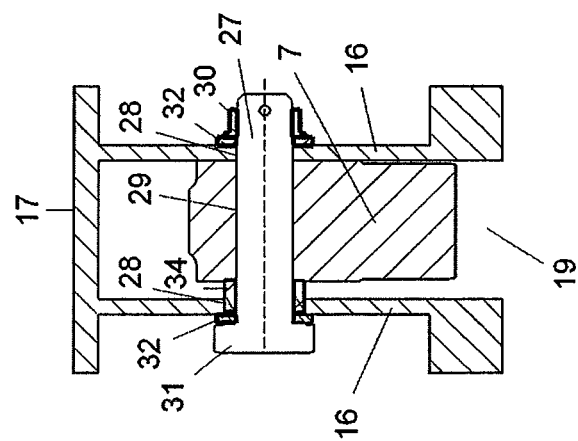
FIG. 5 shows a cross-section along line V-V of the high-lift device track of FIG. 4.

Turning now to FIG. 3, each track 5 comprises also side raceways 12 to each side. When the track 5 is mounted in the aircraft wing 1, each side raceway 12 faces a glide pad also mounted, in this particular embodiment, on the nose ribs of the main body 2 of the wing 1, restricting the lateral movement of the track 5 out of said vertical plane. Each track 5 comprises two vertical flanges 16 connected by a horizontal web 17. As can be seen in FIG. 4, over a first segment 18 of the track 5, said horizontal web 17 is adjacent to the upper edges of the flanges 16, so that the track 5 has a cross-section in an inverted-U, or ⊓ shape, as shown in FIG. 5. A first channel 19 formed between the flanges 16 and horizontal web 17 is thus deep enough to accommodate the gear rack 7.

Figure 6:
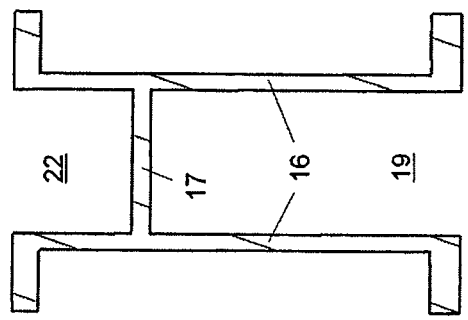
FIG. 6 shows a cross-section along line VI-VI of the high-lift device track of FIG. 4.

Between this first segment 18 and a second track end 20 opposite to said first track end 6, the track 5 comprises a second track segment 21 over which the curvature of the horizontal web in the vertical plane increases, so that the depth d of said first channel 19 between the bottom edges 25 of the flanges 16, and the bottom surface 26 of the horizontal web 17 decreases towards said second track end 20. A second channel 22 of increasing depth d' towards the second track end 20 opens opposite to the first channel 19. In the illustrated embodiment, the horizontal web 17 maintains a significantly constant thickness throughout this second track segment 21, however a thickness gradient may also be considered. In a preferred embodiment the depth d at the second track end 20 is between one and two thirds of the total depth of the track 5 between the top and the bottom edges of the flanges 16. However, even distances outside this range may be acceptable. The cross-section of the track 5 thus transitions from an inverted-U, or ⊓ shape at the first segment 18 towards an H-shape at the second track end 20, as shown in FIG. 6. It must be noted that, as long as the curvature radius of the horizontal web 17 in the vertical plane remains larger than that of the output pinion 8, it will not interfere with said pinion 8, even at the fully extended slat position.

To manufacture the track 5, in a first step a raw block is forged, so as to produce a forged block 23 with the approximate outer dimensions of the track 5 and mechanical properties improved over those of the raw block. In an alternative embodiment, the raw block may not be forged in this first step, and instead machined directly.

Figure 7:
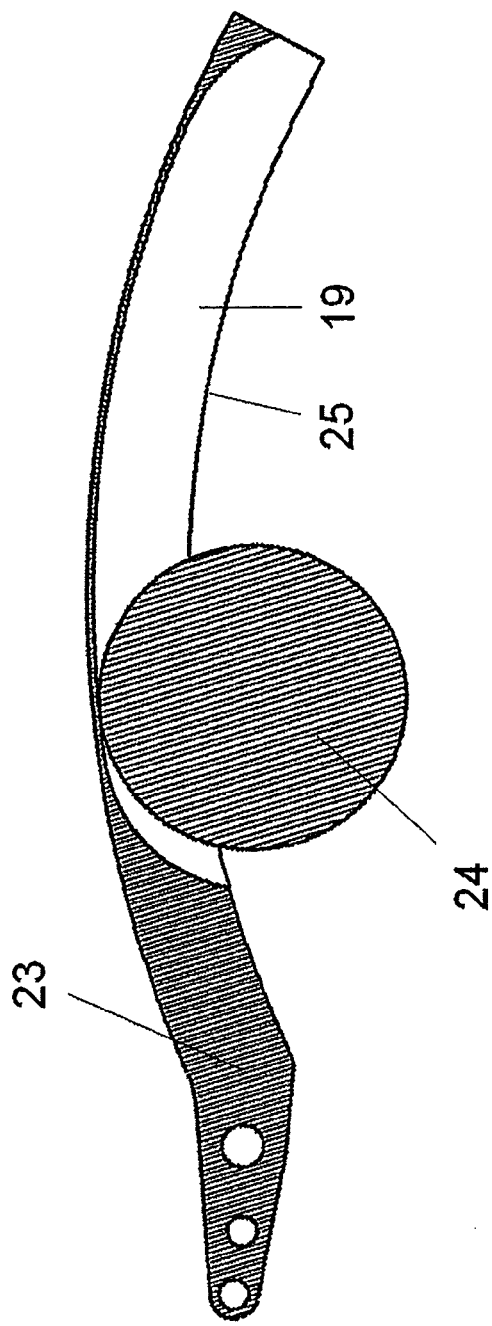
FIG. 7 shows a cutting step in the manufacturing method of the high-lift device track of FIGS. 3-6.

In a subsequent step, illustrated in FIG. 7, the first channel 19 is cut in said forged block 23 using a cutting tool 24. The cutting depth d is progressively reduced over said second track segment 21 towards said second track end 20, so that the internal stresses released at said second track end 20 will not deflect the bottom edges 25 of the flanges 16 laterally beyond a narrow tolerance.

Figure 8:
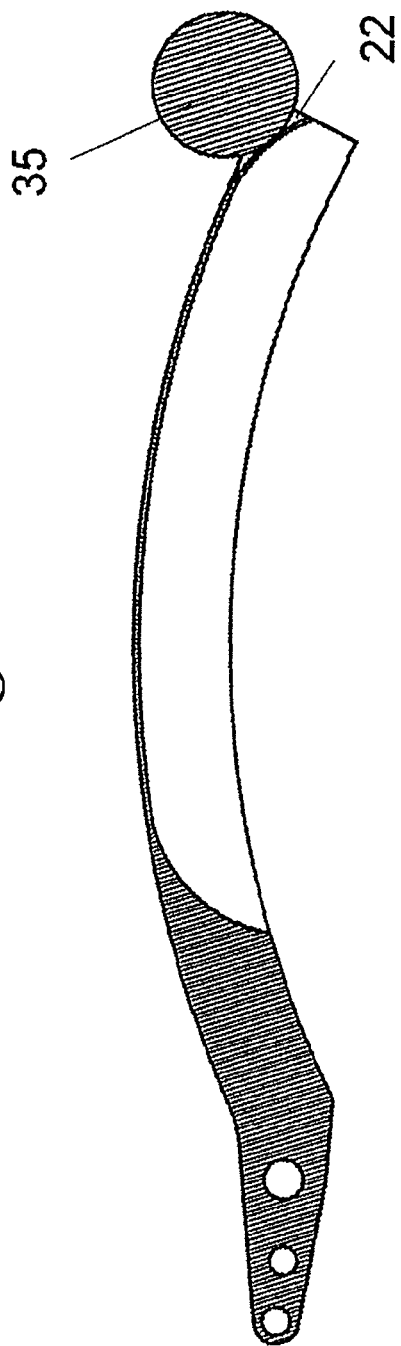
FIG. 8 shows another cutting step in the manufacturing method of the high-lift device track of FIGS. 3-6.

To restrain the total mass of the track 5, in another cutting step illustrated in FIG. 8, the second channel 22 is cut, using a cutting tool 35, on the top of the track 5 over the second track segment 21 with increasing depth d' towards the second track end 20. This depth d' of the second channel 22 increases in substantially the same measure as the depth d of the first channel 19 decreases. In the illustrated embodiment, the thickness t of the horizontal web is thus substantially constant over this second track segment 21. However, the horizontal web could also present a taper towards the track end 20. After the cutting steps, the gear rack 7 is installed in said first channel 19 in said first track segment 18 and fixed in place. A preferred method for fixing the gear rack 7 is by bolting it to the vertical flanges 16 and/or the horizontal web 17. In the embodiment shown in FIG. 4, the gear rack 7 is bolted to the vertical flanges 16 by bolts 27 going through aligned holes 28, 29 in respectively the flanges 16 and the rack 7. An internally threaded nut 30 engages an external thread at a tip of each bolt 27 opposite to the bolt head 31 so as to retain the bolt 27 and thus the gear rack 7. Washers 32 separate the bolt head 31 and the nut 30 from the corresponding flanges 16. In one of the holes 28 in the flanges 16, a sliding bushing 34 separates the external surface of the bolt 27 from the internal surface of the hole 28. This embodiment has the advantage of allowing a quick and easy installation of the gear rack 7.

FIG. 8 shows an alternative embodiment in which the gear rack 7 is also bolted to the vertical flanges 16 in a similar manner, but where, instead of having a single sliding bushing 34 at one side of the gear rack 7, there are two shouldered bushings 34, one at each side of the gear rack 7. Although this embodiment is more complicated to assemble, it allows for lateral adjustment of the gear rack 7 within the track by shimming with annular spacers.

Although the present invention has been described with reference to specific exemplary embodiments, it will be evident that various modifications and changes may be made to these embodiments without departing from the broader scope of the invention as set forth in the claims. Accordingly, the description and drawings are to be regarded in an illustrative sense rather than a restrictive sense.

The invention claimed is:

1. A high-lift device track comprising:
   a first track end comprising attachment points for a high-lift device;
   two vertical flanges connected by a horizontal web;
   a set of raceways for guiding rollers or glide pads; and
   a gear rack installed between said flanges over a first track segment; wherein said first track segment presents an inverted-U or ∏ shaped cross-section; and wherein between said first track segment and a second track end opposite to said first track end, the track comprises a second track segment presenting a depth between the horizontal web and lower edges of the vertical flanges which decreases towards said second track end, so that, at said second track end, the track presents an H shaped cross-section.

2. The high-lift device track according to claim 1, wherein the track is curved in a vertical plane.

3. The high-lift device track according to claim 1, wherein the track is a leading-edge high-lift device track.

4. The high-lift device track according to claim 3, wherein the track is a slat track.

5. The high-lift device track according to claim 1, wherein said raceways comprise an upper raceway over said horizontal web, and a lower raceway over a lower edge of each vertical flange.

6. The high-lift device track according to claim 1, wherein said set of raceways comprise at least two side raceways opposite to each other.

7. A high-lift device assembly comprising:
   at least one high-lift device track comprising:
      a first track end comprising attachment points for a high-lift device;
      two vertical flanges connected by a horizontal web;
      a set of raceways for guiding rollers or glide pads; and
      a gear rack installed between said flanges over a first track segment;
         wherein said first track segment presents an inverted-U or ∏ shaped cross-section; and
      wherein between said first track segment and a second track end opposite to said first track end, the track comprises:
      a second track segment presenting a depth between the horizontal web and lower edges of the vertical flanges which decreases towards said second track end, so that, at said second track end, the track presents an H shaped cross-section; and
   a moveable high-lift device attached to said at least one high-lift device track.

8. The high-lift device assembly according to claim 7, further comprising a set of rollers and/or gliding pads for engaging said raceways.

9. The high-lift device assembly according to claim 7, further comprising a rotational actuator with at least one output pinion for engagement with said gear rack.

10. The high-lift device track according to claim 5 further comprising:
    a moveable high-lift device attached to said at least one high-lift device track.

11. The high-lift device track according to claim 6 further comprising:
    a moveable high-lift device attached to said at least one high-lift device track.

12. An airfoil comprising:
    a main airfoil body;
    at least one high-lift device track according to claim 1;
    a moveable high-lift device attached to said at least one high-lift device track;
    a set of rollers and/or gliding pads mounted on said main airfoil body opposite to said raceways; and
    a rotational actuator with at least one output pinion in engagement with said gear rack.

13. The airfoil of claim 12, wherein said airfoil is an aircraft wing.

* * * * *